Sept. 17, 1963 B. O. WEINSCHEL ETAL 3,104,354

HIGH-FREQUENCY INSERTION LOSS TEST SYSTEM
INCLUDING COUPLED ATTENUATORS

Filed Aug. 31, 1961 2 Sheets-Sheet 1

INVENTORS
BRUNO O. WEINSCHEL
GUNTHER U. SORGER

BY Max L. Libman

ATTORNEY

INVENTORS
BRUNO O. WEINSCHEL
GUNTHER U. SORGER
BY Max L. Libman
ATTORNEY

United States Patent Office 3,104,354

Patented Sept. 17, 1963

3,104,354

HIGH-FREQUENCY INSERTION LOSS TEST SYSTEM INCLUDING COUPLED ATTENUATORS

Bruno O. Weinschel, Bethesda, and Gunther U. Sorger, Rockville, Md., assignors to Weinschel Engineering Co., Inc., Kensington, Md., a corporation of Delaware Filed Aug. 31, 1961, Ser. No. 136,153
5 Claims. (Cl. 324—58)

This invention relates to high-frequency calibration systems and apparatus, and particularly to improvements in a system such as described in the copending application Serial No. 64,766 now Patent No. 3,034,045 of Bruno O. Weinschel for Voltage Ratio Meter for High-Frequency Calibration Systems. The system to which the invention pertains is also described in an article by Hedrich et al., "Calibration of Signal Generator Output Voltage in the Range of 100 to 1000 Megacycles," IRE Transactions on Instrumentation, December, 1958, vol. 1–7, Nos. 3 and 4, pp. 274–279.

In systems of the above type, an I.F. signal derived from the R.F. generator being tested, and another signal from a standard source at the same I.F. frequency, are fed in interlaced fashion to an I.F. amplifier, where, in effect, the signal being tested is compared with the signal from the standard source. In the systems previously described, both the I.F. frequency and the standard frequency must be exactly alike, first, because the bandwidth of frequency response of the I.F. amplifier cannot be made really flat, and secondly, because the I.F. amplifier response changes with level. This is particularly true if the changes in level are very large, which is a practical requirement in these systems. In the above prior art systems, the I.F. differential amplifier has an automatic gain control (A.G.C.) circuit so arranged that the output, that is, the rectified maximum D.-C. output voltage from the linear detector is always kept constant regardless of the input voltage at the I.F. frequency. The sensitivity of the system thus stays constant regardless of the R.F. level. This may require the I.F. amplifier to change its gain, in some cases as much as 60 db, since the R.F. signal also may vary by 60 db. Such a large change requires that the frequency response of the I.F. amplifier must remain identical for a 60 db gain range, if, assuming that both frequencies are not alike the gain for both signals should stay exactly alike.

According to the present invention, this difficulty is avoided by always running the I.F. amplifier at a constant I.F. input level, at constant gain; in this case, the two frequencies can differ by a small amount without doing any harm, because the I.F. amplifier is sufficiently stable during the short period of the measurement not to change its frequency response appreciably during that interval.

In the prior art systems above described, the major problem is really due to the need for a very large gain change. With constant gain, as in the present invention, the frequency response will stay sufficiently constant for practical purposes.

It is a primary object of the invention to overcome the above difficulty in the prior art systems by simple means which permit the I.F. amplifier to be run at a constant I.F. input level and at a constant gain.

The above and other objects are accomplished, according to the invention, by inserting a variable attenuator between the comparison head and the I.F. differential amplifier, the variable attenuator being linked to the operation of the 30 mc. precision piston attenuator in such a manner that the combined attenuation of the two is constant.

The specific nature of the invention as well as other objects and advantages thereof will clearly appear from a description of a preferred embodiment as shown in the accompanying drawings, in which.

Figure 1:
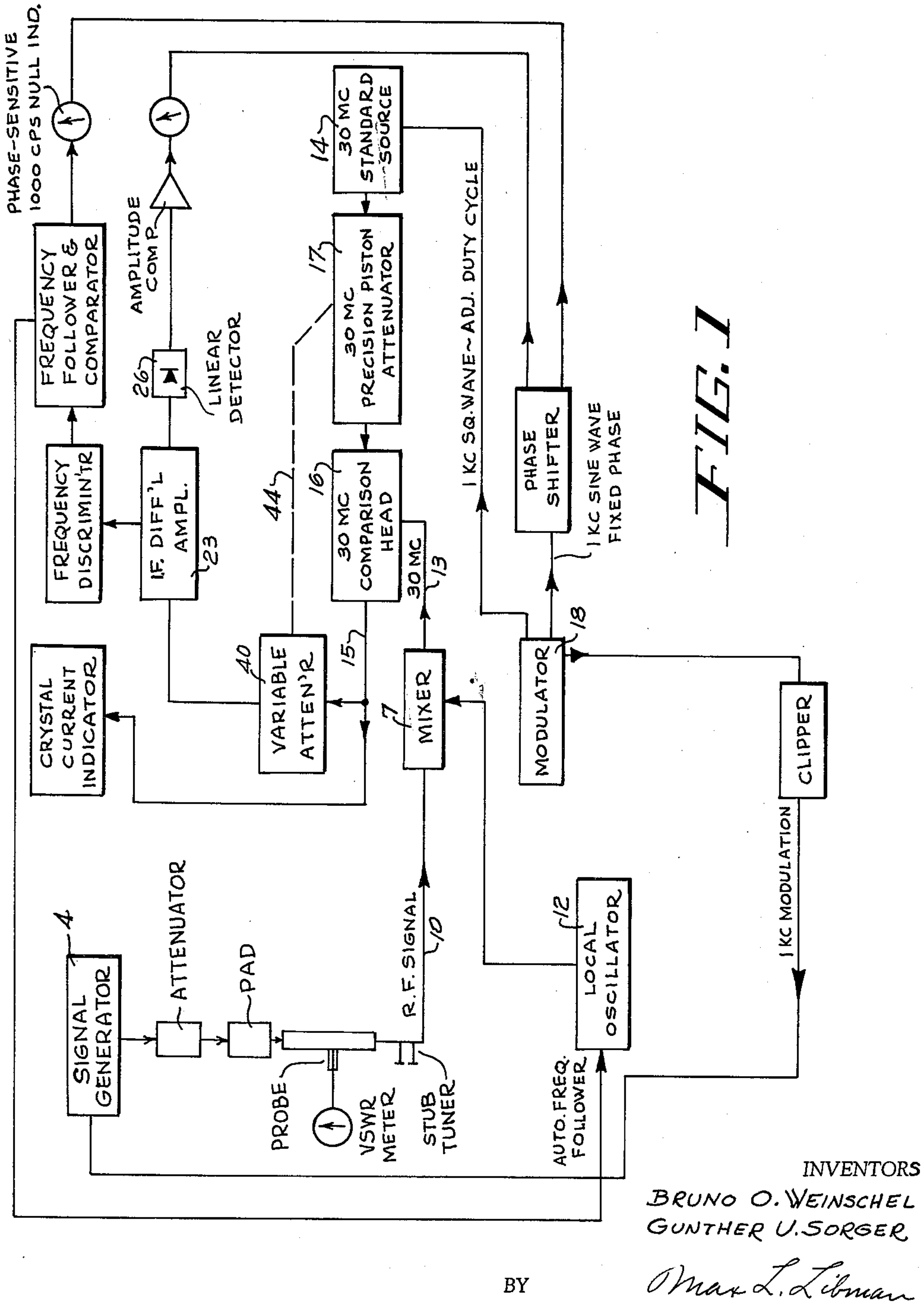
FIG. 1 is a circuit diagram of the entire measuring system, in block form.

FIG. 1 is an essentially self-explanatory diagram in block form of the circuit. The circuit elements from the signal generator 4 to the 30 mc. comparison head 16 are essentially the same as in the above-referenced prior art circuit. Briefly, the R.F. signal being measured is supplied on line 10 to mixer 7, where it is heterodyned with the output of local oscillator 12 to provide a 30 mc. output on line 13 to the 30 mc. comparison head 16; this head is also supplied with the output from the 30 mc. standard source 14, through an adjustable piston attenuator 17, the two inputs being supplied in interlaced fashion, due to the action of modulator 18, which, in effect, alternately switches each input into the comparison head at a 1 kilocycle rate. The interlaced outputs are fed, according to the prior art disclosures, on line 15 directly to I.F. differential amplifier 23. In the prior art disclosures, differential amplifier 23 is provided with a high degree automatic gain control so arranged that the rectified maximum D.-C. output voltage out of the linear detector 26 is always kept constant regardless of the 30 mc. input voltage. This is open to the above-described difficulties and objections, which are eliminated according to the present invention, by the provision of a variable attenuator 40 in line 15. This variable attenuator is mechanically linked, as indicated by dotted line 44, to piston attenuator 17, as will be shown in detail below, in such manner that a linear relationship exists between a moving element of the variable attenuator 40 and the distance of movement of the piston attenuator sending coil. In this manner it is possible to obtain an output voltage from the variable attenuator which is essentially constant, since both devices are connected to vary in the correct sense so as to accomplish this. One way of doing this would be to put two such piston attenuators back-to-back and drive them in such a manner that if one decreases its insertion loss the other increases its loss correspondingly and vice versa. However, it is not necessary to use an actual second piston attenuator, which is both expensive and has some disadvantages for this purpose, due to its inherently large zero insertion loss. In order to have a wide range, the variable attenuator should have a minimum loss of only a few tenths of a db. A variable attenuator which has essentially linear relationship between the output voltage expressed in decibels and the movement of a mechanical component is commercially available; however, it is obvious in the present state of the art to construct such a device so as to produce any desired relationship between the movement of the mechanical adjusting element of the attenuator and its output. If necessary, an exponential mechanical device can be used with an attenuator not having the desired characteristic inherently.

In the above-described system, let us assume that we feed an R.F. signal into the system which is at a level of −10 dbm. We now adjust the 30 mc. piston attenuator to amplitude balance, with respect to −10 dbm. Since in a practical case it is required to measure 60 db, the variable attenuator 40 should be provided with a range of at least 60 db, or in practice, somewhat more than the anticipated loss which it is intended to measure. The gain of the I.F. amplifier is then set at some convenient sensitivity point. This can be done automatically as described in the above-mentioned patent application. The unit under test is now inserted, which will drop the R.F. signal input level, to take an extreme condition, from −10 dbm to perhaps −70 dbm, representing a 60 db change. This means that the R.F. signal voltage is now a thousand times smaller than it was previously. The I.F. signal voltage, since we have a linear mixer, is also 1,000 times smaller than before. If the piston attenuator is now adjusted for electrical balance, which means that its attenuation is increased by 60 db, then the variable attenuator must also change so that its insertion loss is descreased by 60 db, in order to obtain the desired effect. If this is done, the I.F. output voltage at this point remains the same as before, which is, of course, the objective. We now have the I.F. amplifier operating essentially at a constant gain with a constant input voltage, and therefore its frequency response will also be constant.

Figure 2:
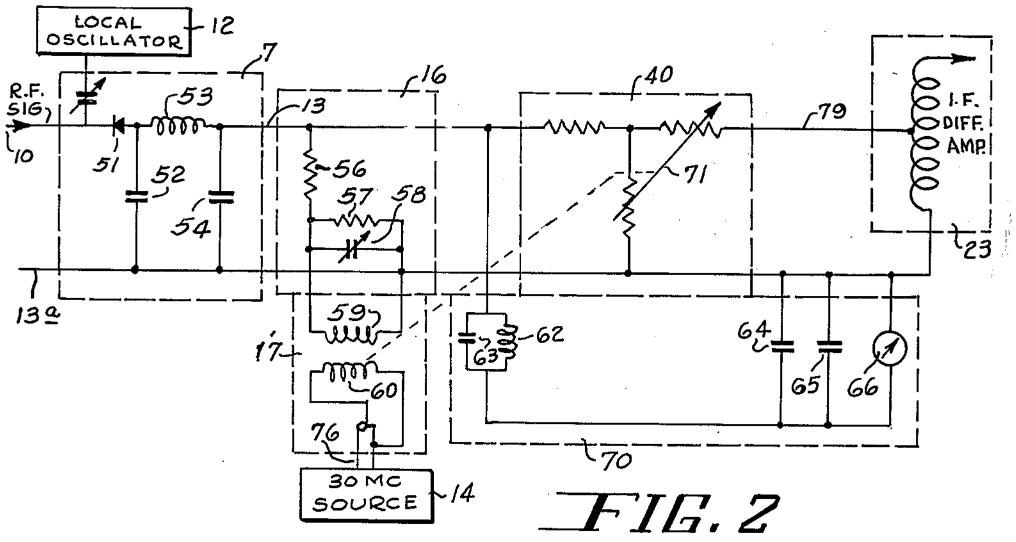
FIG. 2 is a schematic circuit diagram showing in more detail those parts of the circuit with which the present invention is concerned.

Referring to FIG. 2, mixer 7 is supplied, as shown in FIG. 1, with two inputs from local oscillator 12 and on line 10 respectively. The mixer consists of the crystal 51, bypass capacitor 52, choke 53, and filter capacitor 54. The mixer output is supplied on line 13 (line 13*a* is the ground return) to comparison head 16, which contains decoupling resistor 56, a Q-adjusting resistor 57, tuning capacitor 58, and receiving coil 59 of the piston attenuator 17. The sending coil of the piston attenuator is shown at 60, connected to the 30 mc. source 14. Items 56, 57, and 58 together form the comparison head 16. The variable attenuator 40 is shown as a variable T-type network. The crystal current indictor block, shown at 70 in FIG. 2, contains the parallel tuned circuit 62, 63, which is tuned to 30 mc. It also contains the R.F. by-pass capacitor 64 and the low frequency by-pass capacitor 65, as well as the crystal current meter 66. The parallel tuned circuit blocks any 30 mc. signal going into capacitor 64, 65, or meter 66, otherwise the 30 mc. signal would be essentially grounded, since 64, 65 and 66 together are essentially a short for any other signal except that to which the circuit is tuned. The I.F. differential amplifier 23 is connected as shown to the output of the variable attenuator 40. The manual control element, schematically indicated at 71, is mechanically linked to the receiving coil 59 of the piston attenuator, as will be shown in detail in FIG. 3. It will now be apparent that the output from either the I.F. signal or the standard signal will go through the variable attenuator into the I.F. differential amplifier. The above-described system enables improvement in the operation of the prior art system by allowing the R.F. signal or the local oscillator generator to have more incidental frequency modulation than was previously allowable, since the I.F. amplifier can now operate at a constant gain. Previously, 50 kc. was the maximum permissible frequency modulation, but with the above system, 500 kc. of incidental frequency modulation is permissible.

Figure 3:
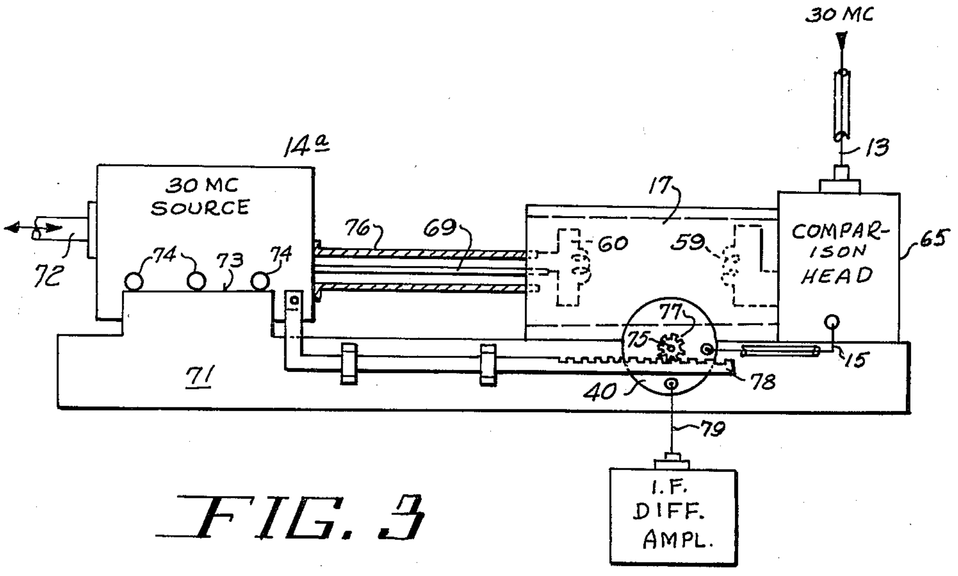
FIG. 3 is a schematic diagram of a mechanical arrangement for carrying out the invention.

Referring to FIG. 3, the 30 mc. source 14 of the previous figures is mounted in housing 14*a*, which is slidably movable on bed 71 by adjustment of rod 72 from right to left, which may be done by any suitable mechanism (not shown). Although any suitable mechanism may be used, for the purpose of illustration a track 73 is shown mounted on bed 71, and rollers or wheels 74 are shown for slidably supporting housing 14*a* on track 3, there being, of course, a similar arrangement on the far side which is not visible. The output of the 30 mc. source passes through a hollow tube 76, which is very rigidly constructed, and has a central coaxial conductor 69 (schematically shown in FIG. 2) whereby the two elements form a rigid coaxial conductor leading into the 30 mc. piston attenuator 17, which is, in effect, a hollow block having a longitudinal central aperture therein, in which coil 60 of the piston attenuator is movable relative to coil 59, which is fixed at the other end of the longitudinal aperture in block 17. The coaxial conductor 76, 69, bears at its end a sending coil 60, which moves back and forth in the aperture in block 17, as housing 14*a* is moved. The stationary receiving coil 59 leads directly to the comparison head, as also shown in FIG. 2. The 30 mc. I.F. signal from the mixer is fed to the comparison head on line 13 (as also shown in FIG. 2) The comparison head elements shown in FIG. 2 are housed in a casing 65 which is physically fixed to the bed 71 and therefore remains stationary together with fixed coil 59. The output lead 15 from the comparsion head provides the input to the variable attenuator 40, which is also fixed relative to the bed 71 and is of the well-known type having an operating shaft 75 which is rotated to vary the attenuation of the unit. A pinion 77 is fixed to shaft 75, and is rotated by rack 78, which is in turn fixed to the movable housing 14*a*, and therefore moves together with movable coil 60 of the piston attenuator. It will thus be apparent that the setting of the variable attenuator is a direct function of the setting of the piston attenuator, which is the required condition. The output of the variable attenuator 40 is supplied on line 79 to the I.F. differential amplifier 23. It will be apparent that various other mechanical arrangements may be employed to secure the same result. A suitable variable attenuator for the purpose is commercially available in the United States. These attenuators have an output voltage, expressed in decibels, which is linearly related to the movement of a mechanical element. It will be apparent that a pointer rigidly connected to the shaft 75 can be calibrated in decibels upon a uniform circular scale if desired. Although the showing is purely schematic, it will be understood that ordinarily all of the conductors and connectors will be high-frequency circuit elements such as coaxial cables, coaxial connectors, etc.

It will be apparent that the mechanical arrangement of FIG. 3 corresponds to the schematic circuit arrangement of FIG. 2, and shows a physical means whereby the distance of motion of the movable coil 60 of the piston attenuator is directly proportional to the logarithm of the ratio of the two outputs. Therefore, the output voltage appearing at connector 15 will remain constant, which is the desired condition of operation.

It will be apparent that the embodiments shown are only exemplary and that various modifications can be made in construction and arrangement within the scope of the invention as defined in the appended claims.

We claim:

1. In an insertion loss test system, a high-frequency signal generator, a standard source of I.F., a local oscillator, a mixer for beating the output of said generator with the output of the local oscillator to provide a beat frequency output at the same frequency as the standard I.F. source, and an I.F. amplifier; means for alternately supplying the output from said standard source and from said mixer in counterphase to said I.F. amplifier for comparison, said last means including a first variable attenuator in the output circuit of the standard source, said attenuator having a movable element adjustable to vary the attenuation, a comparison head having input terminals respectively supplied by the output of said first attenuator and by the mixer output, and having also an output terminal, a second variable attenuator connected between said output terminal and said I.F. amplifier, said second attenuator having a movable element for varying the attenuation thereof, and linkage means between the movable elements of the first and second attenuators for varying the attenuation of said second attenuator in accordance with the adjustment of said first attenuator.

2. The invention according to claim 1, said first attenuator being a piston attenuator and its movable element being linearly movable to adjust its attenuation.

3. The invention according to claim 2, said second attenuator having a relationship between the amount of its motion and its output which is substantially the same as that of the first attenuator, the linkage between the two being such that they vary in opposite senses so as to maintain a constant input to the I.F. amplifier as said first attenuator is adjusted to a condition of balance with the mixer output.

4. The invention according to claim 3, the movable element of said second attenuator being a rotary element, said linkage means between the two attenuators being a mechanical linkage for transferring the linear motion of the piston attenuator to rotary motion for adjusting said rotary element.

5. In an insertion loss test system of the type comprising a high-frequency signal generator, a standard source of I.F., a local oscillator, a mixer for beating the outputs of the local oscillator and of said generator to provide a beat frequency output at the same frequency as the standard I.F. source, and an I.F. amplifier;

(a) means for alternately supplying the output from said standard source and from said mixer in counterphase to said I.F. amplifier for comparison, (b) said last means including a first variable attenuator in the output circuit of the standard source, said attenuator having a movable element adjustable to vary the attenuation, (c) a comparison head having input terminals respectively supplied by the output of said first attenuator and by the mixer output, and having also an output terminal, (d) a second variable attenuator connected between said output terminal and said I.F. amplifier, (e) said second attenuator having a movable element for varying the attenuation thereof, (f) linkage means between the movable elements of the first and second attenuators for varying the attenuation of said second attenuator in accordance with the adjustment of said first attenuator, but in an opposite sense, so as to maintain a constant output to the I.F. amplifier as said first attenuator is adjusted to a condition of balance with the mixer output.

References Cited in the file of this patent

UNITED STATES PATENTS

| | | |
|---|---|---|
| 2,419,527 | Bartelink | Apr. 29, 1947 |
| 2,424,833 | Korman | July 29, 1947 |
| 2,499,755 | Hunt | Mar. 7, 1950 |
| 2,587,493 | Loughlin | Feb. 26, 1952 |
| 3,029,336 | Ferrar | Apr. 10, 1962 |